United States Patent
Kulkarni et al.

(10) Patent No.: US 10,459,698 B2
(45) Date of Patent: Oct. 29, 2019

(54) FRAMEWORK FOR GENERATING ADAPTERS IN AN INTEGRATED DEVELOPMENT ENVIRONMENT

(71) Applicant: SAP SE, Walldorf (DE)

(72) Inventors: Gopalkrishna Kulkarni, Bangalore (IN); Shankara Prasad K, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/865,265

(22) Filed: Jan. 9, 2018

(65) Prior Publication Data
US 2019/0212990 A1 Jul. 11, 2019

(51) Int. Cl.
G06F 9/44 (2018.01)
G06F 8/34 (2018.01)
G06F 8/71 (2018.01)
G06F 8/41 (2018.01)
G06F 8/33 (2018.01)

(52) U.S. Cl.
CPC .............. *G06F 8/34* (2013.01); *G06F 8/33* (2013.01); *G06F 8/433* (2013.01); *G06F 8/71* (2013.01)

(58) Field of Classification Search
CPC ........................................................ G06F 9/44
USPC ................................................ 717/106–109
See application file for complete search history.

(56) References Cited

U.S. PATENT DOCUMENTS

| | | | | |
|---|---|---|---|---|
| 7,337,409 B2* | 2/2008 | Doblmayr | ............. | G06F 3/0486 |
| | | | | 715/769 |
| 2002/0188890 A1* | 12/2002 | Shupps | ..................... | G06F 8/75 |
| | | | | 714/38.14 |
| 2006/0064685 A1* | 3/2006 | DeFolo | ................... | G06F 8/658 |
| | | | | 717/169 |
| 2006/0184926 A1* | 8/2006 | Or | ............................. | G06F 8/61 |
| | | | | 717/168 |
| 2008/0147704 A1* | 6/2008 | Godwin | ................... | G06F 16/22 |
| 2009/0125874 A1* | 5/2009 | Abdelhadi | ................ | G06F 8/71 |
| | | | | 717/101 |
| 2009/0265390 A1* | 10/2009 | Asanuma | ............... | G06Q 10/06 |
| 2009/0313281 A1* | 12/2009 | Lowry | ............. | G06F 17/30958 |
| 2010/0095268 A1* | 4/2010 | Lowry | ................... | G06Q 10/10 |
| | | | | 717/102 |
| 2016/0098265 A1* | 4/2016 | Mahajan | ................... | G06F 8/43 |
| | | | | 717/170 |

OTHER PUBLICATIONS

OSGI Alliance; The Dynamic Module System for Java; accessed Jan. 8, 2018; CA; USA; (hhttp://www.osgi.org/Specifications/HomePage).

* cited by examiner

*Primary Examiner* — Jae U Jeon
(74) *Attorney, Agent, or Firm* — Buckley, Maschoff & Talwalkar LLC

(57) ABSTRACT

Methods and system are disclosed that generate adapters via a framework. In one aspect, dependencies between components may be defined via a drag-and-drop action on a user interface provided via an adapter configuration user interface component. Adapter configuration files may be generated by an adapter configuration component, such that the adapter configuration files may include information associated with the dependencies. At runtime, a dependency analyzer component may resolve the dependencies based on definitions associated with the dependencies. In an embodiment, upon resolving the dependencies, adapters may be generated at the framework.

18 Claims, 5 Drawing Sheets

US 10,459,698 B2

FRAMEWORK FOR GENERATING ADAPTERS IN AN INTEGRATED DEVELOPMENT ENVIRONMENT

BACKGROUND

Software applications may be developed through software development process, in a planned and structured way. The planned and structured way of software development process may include developing software applications using computer programming, composing documentation, testing the software applications, etc. Typically, the task including computer programming may include writing code using a programming language, compiling the code, debugging code, etc. In an embodiment, integrated development environments (IDE) may be used to develop the software applications. However, when the platform specifications for developing software applications are modified, software application developers may find it challenging to adapt to such modifications. Further, such modifications may add complexity and challenges such as, checking for compliance of the software application with the modified platform specifications. Therefore, providing a framework that integrates with the IDE, such that any modifications in the platform specifications are resolved at a runtime during the process of software application development, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
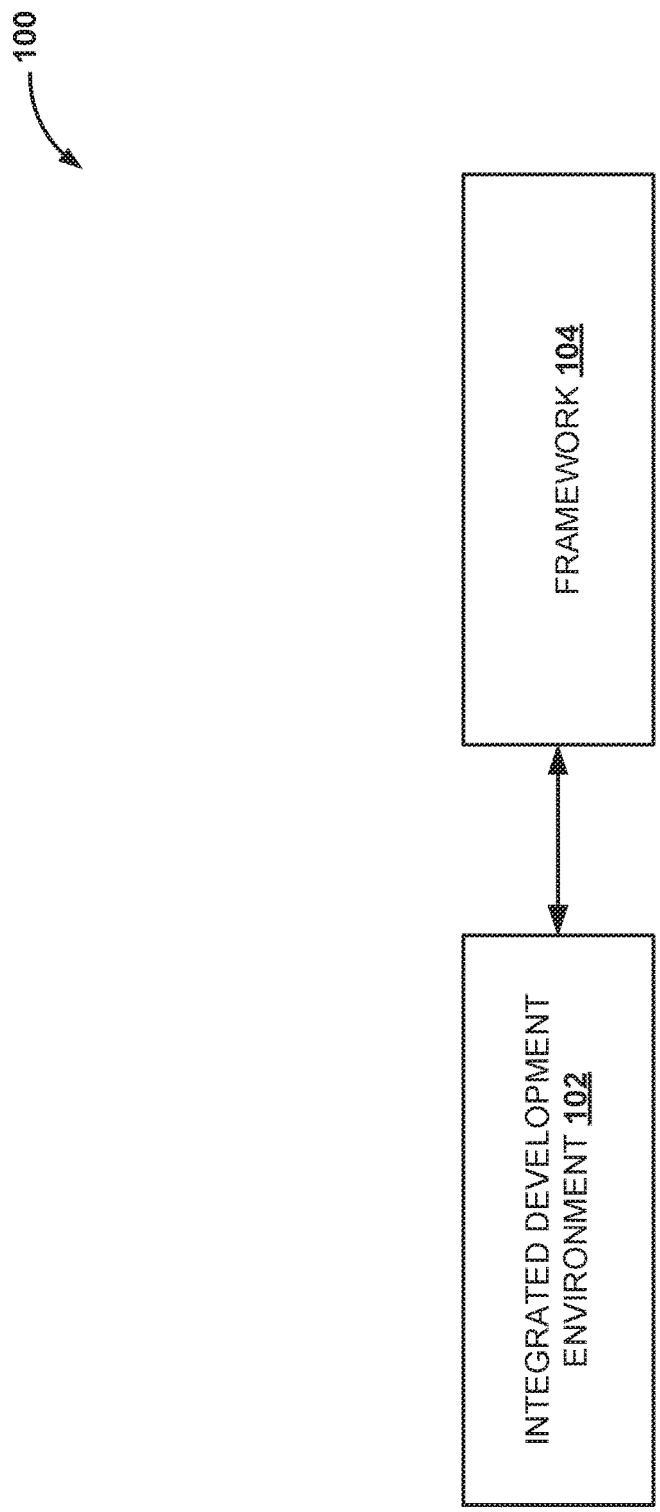
FIG. 1 is a block diagram illustrating system, at a high-level, including a framework for generating adapters, according to an embodiment.

Embodiments of techniques related to framework for generating adapters in an integrated development environment are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

An Integrated Development Environment (IDE) may correspond to a software application that may facilitate development of other software applications. The IDE may provide an integration of source code editor, debuggers, automation tools, user interface engines, data models, model editors, graphical editors, text editors, source code version control, etc. In an embodiment, an intelligent code completion feature may determine multiple programming languages, and provide suggestions for completing code. Such features may optimize the process of software development. The multiple editors (e.g., model editors, text editors, graphical editors, etc.), models, debuggers, automation tools, features, etc., may be integrated to provide execution of operations or functions, either independently or by working in cooperation.

In an embodiment, the terms software components or components, software routines or routines, software models or models, software engines or engines, software scripts or scripts, layers etc., are employed interchangeably throughout the subject specification, unless context warrants particular distinction(s) among the terms depending on implementation. The implementation primarily involves executing a computer readable code such as, a sequence of instructions by a processor of a computing device (e.g., a special purpose computer, a general-purpose computer, mobile device, etc.) in an integrated environment. The computing device is adaptable to function or execute operations (e.g., receiving definitions including dependencies between components, generating adapter configuration files, resolving dependencies at runtime, generating adapters at framework, etc.), thereby adapting the computing device as a special purpose computer. In some instances, the memory may store instructions that may not be limited to the aforementioned specific operations or functionalities. Unless the context warrants particular distinction(s), the cooperative execution of the above described arrangement of components, scripts, routines, etc., providing specific operations or functionalities may further improve the functioning of the special purpose computer. Further the special purpose computer may be adapted to perform operations or functionalities (e.g., as described above) that were not performed previously. Further, the execution of the aforementioned specific operations or functionalities may also overcome the drawbacks or challenges, as described in the background section of the subject specification.

FIG. 1 is a block diagram illustrating system 100, at a high-level, including a framework for generating adapters, according to an embodiment. In an embodiment, IDE 102 is integrated to work in cooperation with a framework 104, which may facilitate development of software applications. The IDE 102 may include multiple integrated software components, tools, engines, software scripts, etc., such as debuggers, automation tools, user interface engines, graphical editors, text editors, etc. In an embodiment, the IDE may be integrated with framework 104 (hereinafter also interchangeably referred to as framework) for generating adapters, at runtime of the IDE. For example, such adapters may correspond to components that may be deployed on servers and may facilitate execution of specific operations. An adapter may correspond to a component that may facilitate connecting with multiple systems deployed in back-end. Adapters may include properties, for example, sheet UI that may include connection details, query to retrieve the information, authentication information etc. The adapter may also include a runtime component that may connect to the systems and retrieve the information after successful authentication. For example, an adapter may facilitate retrieving related information to specific time period. The framework 104 may further include (not shown) multiple integrated components, such as configuration to specific build tool transformer, dependency analyzer, adapter configuration user interface (UI), adapter configuration, etc. In an embodiment, the integrated components may communicate with each other via remote procedure calls (RPC) which may facilitate inter-process communication between the components. The components of framework 104 may execute either independently or cooperatively, to facilitate execution of operations or functions. The framework 104 may provision resolving dependencies, grouping multiple adapters, sharing dependencies, etc. For example, multiple adapters may be grouped into a single adapter or into fewer adapters that may facilitate reusing runtime component of the adapters, adapters UI, etc., and dependencies may be shared between multiple grouped adapters. The components of framework may facilitate cooperative working via a request-response mechanism (e.g., protocol). For instance, the adapters may communicate with components of the framework that are adapted to communicate with each other. The request mechanism may include sending a request to the component with parameters (e.g., properties or attributes) and parameter values.

Figure 2:
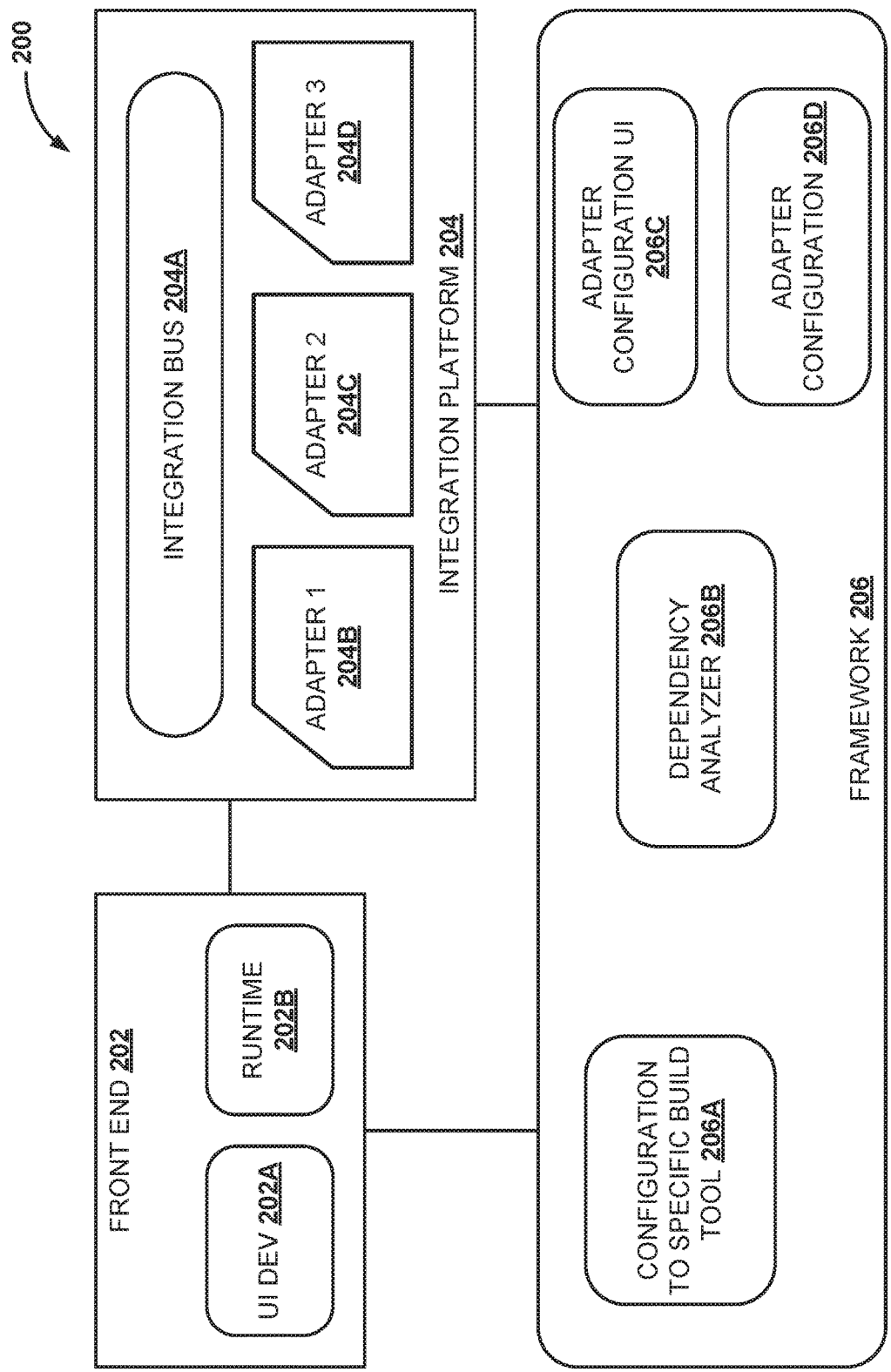
FIG. 2 is a block diagram illustrating system including framework for generating adapters, in an integrated development environment, according to an embodiment.

FIG. 2 is a block diagram illustrating system 200 including framework 206 for generating adapters, in an integrated development environment, according to an embodiment. In an embodiment, during a runtime of the IDE when developing software applications, adapters may be generated via framework 206 integrated with the IDE. FIG. 2 shows system 200 including front end 202, integration platform 204 and framework 206 integrated to work in cooperation for defining dependencies between components, software codes, etc., and generating adapters during runtime. The adapters may be generated at the runtime, that are configured to comply with specifications (e.g., contracts, definitions of interfaces, etc.) of the platform (e.g., platform for developing software applications). For example, the platform, for example, Open Service Gateway interface (OSGi) may facilitate developing only specific type of applications. OSGi platform specification may implement dynamic component model and the specification may not support deployment or development of software applications that are not compliant with the OSGi specification. The specifications of the platform may be modified based on a context of programming platform. As described previously, the IDE may include an integration of source code editor, debuggers, automation tools, user interface engines, data models, model editors, graphical editors, text editors, source code version control, etc., that may facilitate building platform specific software applications. FIG. 2 shows front end 202 including user interface (UI) developer (dev) (UI DEV 202A) and runtime 202B components. The UI dev 202A may provide user interface for executing functions or operations. The integration platform 204 may include integration bus 204A and multiple adapters (e.g., shown as adapter 1 204B; adapter 2 204C; adapter 3 204D, etc.). The framework 206 may include components configuration to specific build tool 206A, dependency analyzer 206B, adapter configuration UI 206C and adapter configuration 206D.

In an embodiment, the IDE in cooperation with framework 206 may also facilitate execution of certain runtime functionalities, such as determination of platform specifications at runtime (e.g., information related to contracts, interfaces, etc.), resolving the dependencies between components or application packages (e.g., bundled as software libraries), determining whether the dependencies are compliant with the platform specifications (e.g., contracts), etc. For example, suppose software library A depends on (or uses all or certain segments of code in the software library) software library B, and suppose that project C (e.g., project C may correspond to building a software application) uses software library A, then project C may include software library B during the runtime for building the project C, as software library A depends on software library B. Such dependencies (e.g., the dependency of software library A on software library B) may be defined at a design time via a user interface provided by the framework. The framework 206 in cooperation with the IDE may facilitate determining such dependencies, resolving the dependencies by including the dependent software libraries, etc., during the runtime. In an embodiment, framework 206 may generate adapters at the runtime, may facilitate execution of operations or functions, such as retrieving or transferring data from or to the back-end systems (not shown).

In an embodiment, adapters (e.g., shown as adapter 1 204B; adapter 2 204C; adapter 3 204D, etc.) generated by framework 206 may correspond to software components that may be deployed on servers that may provide execution of specific operations. The adapters may be configured to cooperatively work with multiple system and application interfaces, components, software engines, scripts, data stores, etc. The adapters may facilitate execution of operations, for example, retrieving data from back-end systems, transferring data to client applications and systems deployed in different computing environments (e.g., on-premise or cloud computing environments). In an embodiment, the adapters are generated and deployed on servers (e.g., implemented) to replicate execution, for example, in a sandbox mechanism. The sandbox mechanism of implementation may facilitate concurrent execution of operations by multiple adapters, without interrupting the other adapters in the framework. For example, an execution of unverified or untested program code or an application developed by third parties, may be implemented for execution via the sandbox mechanism. Further, the sandbox implementation mechanism may provide abstraction, thereby enhancing security and control over an execution of operations between the adapters. Such provisioning of the sandbox mechanism may provide virtualization, thereby preventing the risk of malicious attacks. In an embodiment, the adapters may communicate with each other by calling functions, for example, calling application programming interfaces (APIs). The adapters may include user defined properties and/or user defined property values, that may further be configurable at the runtime by system administrator. Such a provision for reconfiguration at the runtime provides an advantage of preventing redeployment of the adapter, to comply with the modified user defined properties and/or user defined property values. Such an adaptability to reconfiguration at runtime may provision controlling the adapter's behavior in different environments, for example, development, testing, real time deployment, etc.

In an embodiment, framework 206 may provision generating the adapters that provide specific functionalities based of the specifications of the platform. The adapters may be generated at runtime by resolving the dependencies (e.g., dependencies are resolved automatically at runtime) between program codes, software libraries, etc., when developing software applications. In an embodiment, resolving the dependencies may correspond to determining the dependencies based on the context of programming platforms and the specifications of the platforms. The dependencies may be defined during the design time and may be resolved during the runtime of the IDE. In an embodiment, the adapters may include artifacts or components, for example, adapter application package interface (adapter API), adapter plug-in, custom security base classes, etc. The adapter API may include information related to third-party dependencies that may be resolved and compiled by the adapter at the runtime. The adapter plug-in may be used to build and deploy the adapter and may be defined in a configuration file (e.g., project object model (pom) using eXtensible Markup Language (XML) programming language). For example, consider an adapter configuration file including details: Adapter Name: "abc". Dependencies (dependent components): "pqr", "xyz", etc.; Non-dependent components: "uvw." In an embodiment, the dependencies, for example, dependent key components may correspond to configuration file keys, which may be used for retrieving information related to "pqr", "xyz", etc.

In an embodiment, during the design time, framework 206 may facilitate defining or including dependencies via a drag-and-drop mechanism (e.g., using adapter configuration UI 206C). In another embodiment, framework 206 may provision defining the dependencies by including coordinates of a central repository that may store specific information about the dependencies. In an embodiment, during the runtime, framework 206 working in cooperation with the IDE, may automatically resolve the dependencies by determining the dependencies and execute the build operation to generate adapters when developing the software applications. The framework 206 working in cooperation with the IDE may be configured to execute dependency validation mechanisms, for example, validate the dependencies and eliminate any duplicate or redundant dependencies. As shown in FIG. 2, framework 206 includes components, such as configuration to specific build tool 206A, dependency analyzer 206B, adapter configuration UI 206C and adapter configuration 206D.

In an embodiment, adapter configuration UI 206C may provide a user interface that may be used for defining the dependencies via a drag-and-drop action by an end user. The adapter configuration UI 206C may render (e.g., display) the dependencies and by working in cooperation with the component adapter configuration adapter configuration 206D may facilitate generating the adapter configuration file. The adapter configuration file may include an interface to input additional information or details related to the dependencies, for example, version, runtime components, dependent components, native dependent components, etc. The component adapter configuration 206D may generate the configuration file that includes configuration information (e.g., including the dependencies) and the configuration information may be included in a XML file. In an embodiment, the component adapter configuration 206D may cooperatively work with the component adapter configuration UI 206C to define configuration information during design time. The component configuration to specific build tool 206A may parse the adapter configuration file and generate industry standard build specification Java archive (JAR) for building the software applications. During runtime, the component dependency analyzer 206B may execute to verify or validate the dependencies defined or included during the design time (e.g., using the adapter configuration UI 206C) and may automatically correct (e.g., autocorrect) the dependencies based on platform specifications. In an embodiment, the validation mechanism may resolve the dependencies and verify for selection of appropriate version of the dependencies. Further, the validation mechanism may also verify if the dependencies are valid with reference to the platform specification. For example, a dependent component may be programmed using same language as that of framework specification (e.g., Java). Also the jar type may be compliant with the platform specifications (e.g., OSGi), For example, consider developer is developing an adapter A and adds dependency B of version 2.0. But in the integration server (container) in the framework, the B's version is 1.0. In such a scenario, the validation may fail and the framework may report an error. In an embodiment, the mechanism for autocorrecting the dependencies may be executed, when the component dependency analyzer 206B determines that the included dependencies do not comply (e.g., non-compliant) with the platform specifications (e.g., contracts, interfaces, etc.). For example, a dependency may import multiple services which may not be compliant with the platform specifications (e.g., OSGi). Such runtime validation by auto correcting the dependencies may optimize resolution and migration the dependencies. The dependencies may be validated for compliance with the platform specifications, at runtime. In an embodiment, such runtime validation of the dependencies for compliance may optimize the end user development efforts for building the software applications. The dependency analyzer 206B may also analyze the dependencies and determines variables (e.g., variables in program code, software libraries, header files, etc.) that may be used and declared, used and undeclared, unused and declared. The response of the analysis of dependency analyzer 206B may further include list of mismatches between variables thereby indicating resolved dependencies and unresolved dependencies.

Figure 3:
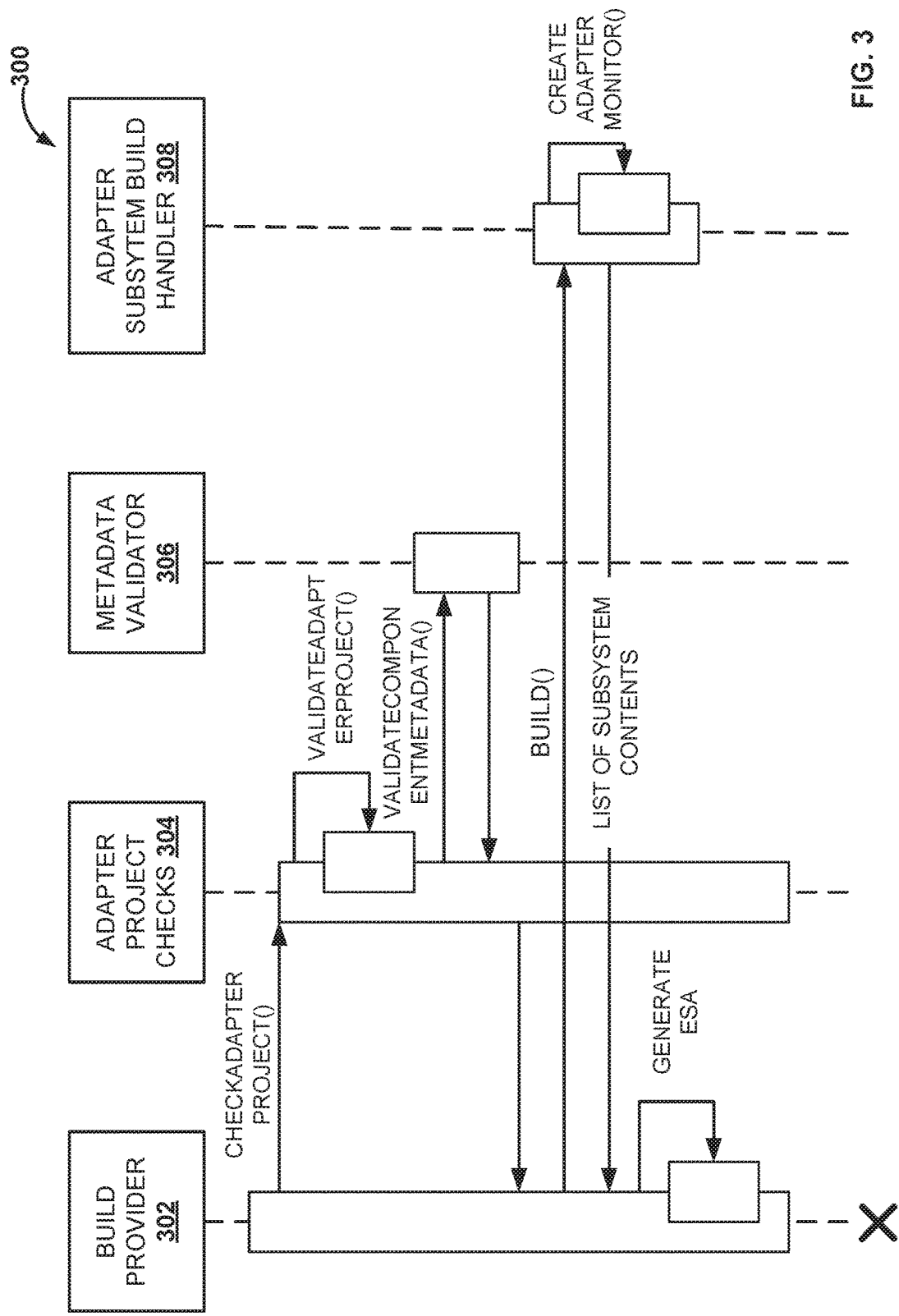
FIG. 3 is sequence diagram illustrating an aspect of implementation including a flow for generating adapters when building software applications, according to an embodiment.

FIG. 3 is sequence diagram 300 illustrating an aspect of implementation including a flow for generating adapters when building software applications, according to an embodiment. FIG. 3 shows a sequence diagram including a flow for generating adapters when building a software application. In an embodiment, the IDE may cooperatively work with framework (e.g., 206 in FIG. 2) and additional components (e.g., 302, 304, 306 and 308) to facilitate building software applications. In an embodiment, the component build provider 302 may initiate communication with the component adapter project checks 304 via an execution of API or function call, for example, checkAdapter Project( ). Upon execution of the API or function call checkAdapterProject( ), the component adapter project checks 304 may execute API or function call validateAdapterProject( ) to validate the adapter. In response to the validation, the component adapter project checks 304 may initiate a communication with a component metadata validator 306 by executing API or function call validateComponentMetadata( ). The response of validation by metadata validator 306 component may be communicated back to adapter project checks 304 component. In an embodiment, build provider 302 component may communicate with adapter subsystem build handler 308 component by executing API or function call build( ). The adapter subsystem build handler component may execute API or function call createAdapterMonitor( ) and a list of subsystem contents (e.g., dependencies) may be communicated by adapter subsystem build handler 308. Upon receiving the list of subsystem contents from adapter subsystem build handler 308, build provider 302 may generate the adapter (e.g., generate enterprise subsystem archive esa). For example, ESA may correspond to file format related to archive defined by platform specification (e.g., OSGi).

Figure 4:
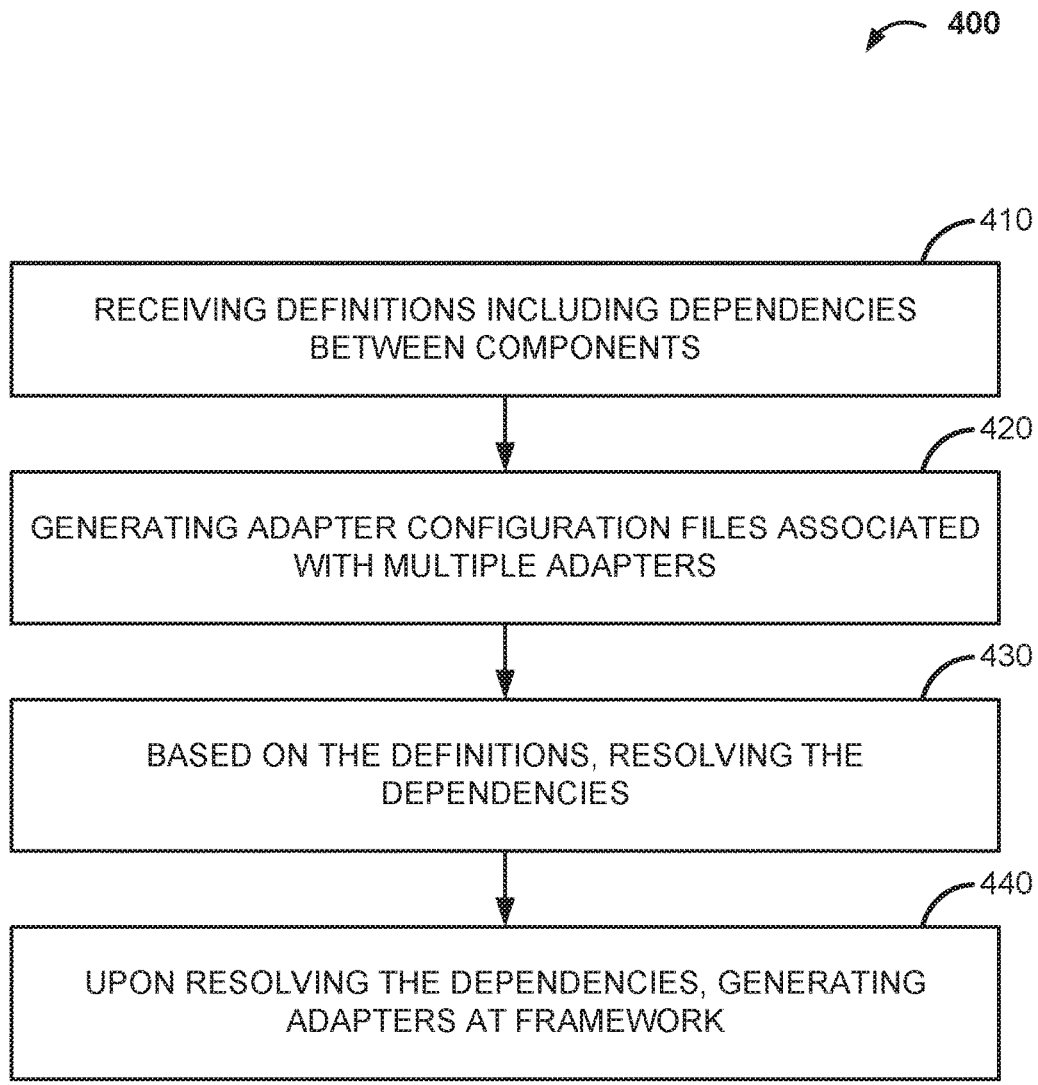
FIG. 4 is a flow diagram illustrating process to generate adapters via a framework, according to an embodiment.

FIG. 4 is a flow diagram illustrating process 400 to generate adapters via a framework, according to an embodiment. In an embodiment, multiple definitions including multiple dependencies are received, at 410. For instance, adapter configuration UI (e.g., 206C in FIG. 2) of framework (e.g., 206) may either provide UI for defining dependencies between software libraries, software code, etc., via drag-and-drop action or operation, or provide coordinates of a central repository that store specific information about the dependencies. In an embodiment, multiple adapter configuration files associated with the adapters are generated, at 420. For instance, each adapter may be correspondingly associated with adapter configuration file. The adapter configuration files may include information associated with the dependencies. The adapter configuration files may be generated by cooperative working between the components adapter configuration UI (e.g., 206C) and adapter configuration (e.g., 206D) at the framework (e.g., 206). In an embodiment, based on the definitions, dependencies are resolved, at 430. For instance, the component dependency analyzer (e.g., 206B) may validate the dependencies and may automatically correct the dependencies to comply with the platform specifications. In an embodiment, upon resolving the dependencies, adapters are generated at the framework, at 440.

In an embodiment, the above described framework (e.g., 206 in FIG. 2) for generating adapters at runtime may provide a platform for integration and communication between back-end systems. The framework (e.g., 206 in FIG. 2) for generating adapters at runtime further facilitates flexibility, adaptation and configuration of the adapters through configuration management (e.g., using JavaScript® API or Java® API), integration of flexible user authentication mechanisms for establishing connections with multiple hack-end systems, control or manage user identities via the established connections or user sessions, optimize the process of retrieving/transferring data from/to the back-end systems, etc. In an embodiment, the framework (e.g., 206 in FIG. 2) may also facilitate grouping multiple adapters, sharing dependencies, etc.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
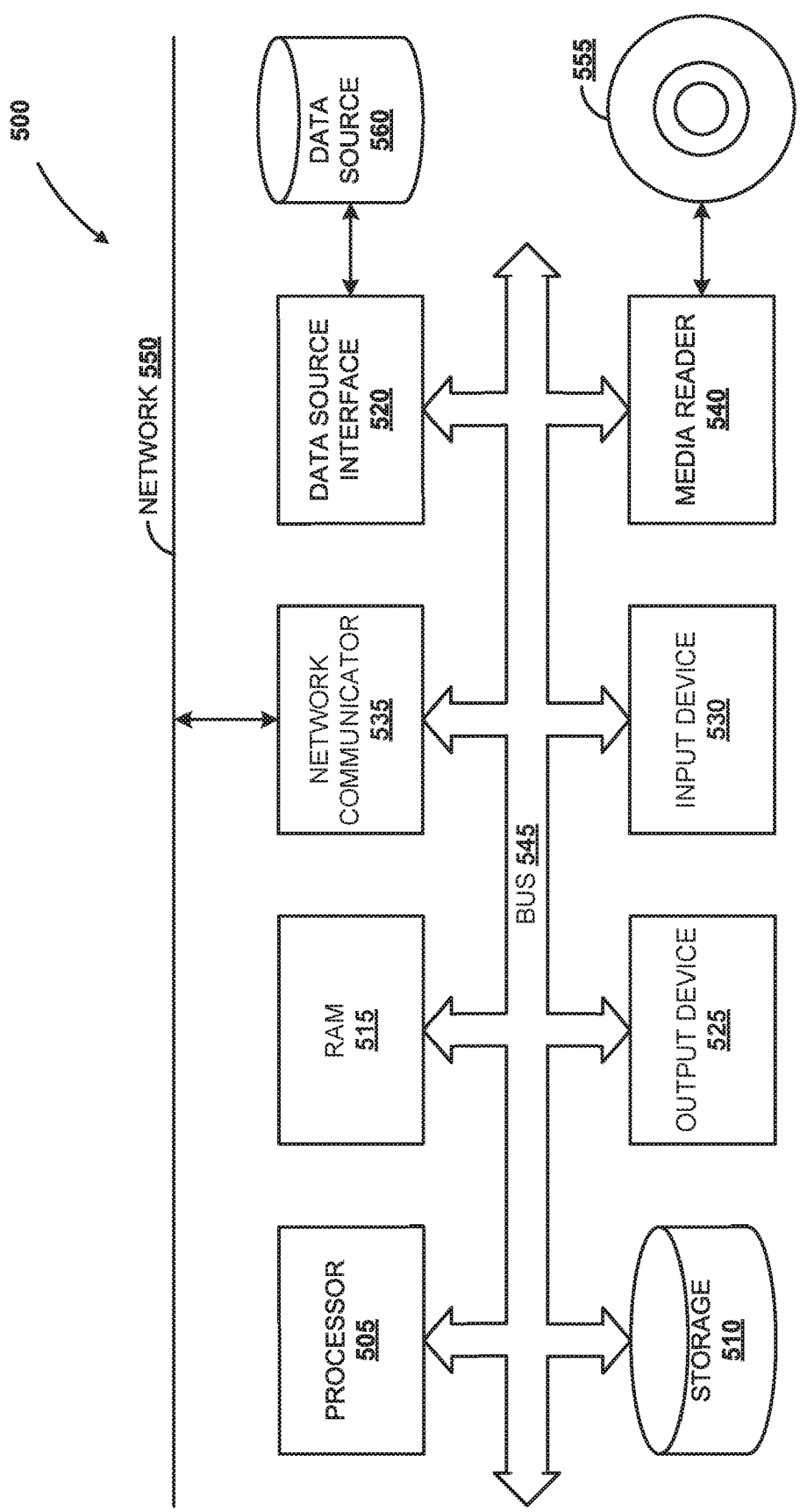
FIG. 5 is a block diagram of a computer system, according to an embodiment.

FIG. 5 is a block diagram of an exemplary computer system 500, according to an embodiment. Computer system 500 includes processor 505 that executes software instructions or code stored on computer readable storage medium 555 to perform the above-illustrated methods. Processor 505 can include a plurality of cores. Computer system 500 includes media reader 540 to read the instructions from computer readable storage medium 555 and store the instructions in storage 510 or in random access memory (RAM) 515. Storage 510 provides a large space for keeping static data where at least some instructions could be stored for later execution. According to some embodiments, such as some in-memory computing system embodiments, RAM 515 can have sufficient storage capacity to store much of the data required for processing in RAM 515 instead of in storage 510. In some embodiments, all of the data required for processing may be stored in RAM 515. The stored instructions may be further compiled to generate other representations of the instructions and dynamically stored in RAM 515. Processor 505 reads instructions from RAM 515 and performs actions as instructed. According to one embodiment, computer system 500 further includes output device 525 (e.g., a display) to provide at least some of the results of the execution as output including, but not limited to, visual information to users and input device 530 to provide a user or another device with means for entering data and/or otherwise interact with computer system 500. Each of these output devices 525 and input devices 530 could be joined by one or more additional peripherals to further expand the capabilities of computer system 500. Network communicator 535 may be provided to connect computer system 500 to network 550 and in turn to other devices connected to network 550 including other clients, servers, data stores, and interfaces, for instance. The modules of computer system 500 are interconnected via bus 545. Computer system 500 includes a data source interface 520 to access data source 560. Data source 560 can be accessed via one or more abstraction layers implemented in hardware or software. For example, data source 560 may be accessed by network 550. In some embodiments data source 560 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system including a framework, comprising:
a processor; and
one or more memory devices communicatively coupled with the processor and storing instructions executable by the processor to:
execute one or more applications;
process one or more definitions received via a user input from an adapter user interface component, the one or more definitions including at least one dependency from a plurality of dependencies between one or more components;
generate one or more adapter configuration files associated with one or more adapters at an adapter configuration component, the one or more adapter configuration files including information associated with the plurality of dependencies;
based on the one or more definitions, resolve, at runtime of the one or more applications, the at least one dependency from the plurality of dependencies at a dependency analyzer component; and
in response to resolution of the at least one dependency, generate the one or more adapters at the framework, wherein the one or more adapters comprise an adapter application package interface (API), the adapter API comprising information relating to third-party dependencies capable of being resolved and compiled by the one or more adapters at runtime.

2. The computer system of claim 1, wherein the user interface component is to provide a user interface to receive, via a drag-and-drop operation, the user input comprising the one or more definitions including the one or more.

3. The computer system of claim 1, further comprising: a configuration to specific build tool component for parsing the one or more adapter configuration files and build one or more build specification files.

4. The computer system of claim 1, wherein the dependency analyzer component is to resolve the at least one dependency by validating the one or more definitions associated with the plurality of dependencies.

5. The computer system of claim 1, wherein the instructions are further executable the processor to autocorrect the at least one dependency at least partially in response to a non-compliance of the plurality of dependencies being determined by the dependency analyzer component.

6. The computer system of claim 1, wherein the one or more adapter configuration files include information related to the plurality of dependencies, the information comprising a version, one or more runtime components, and/or one or more dependent components.

7. A non-transitory computer readable storage medium tangibly storing instructions executable by a computer to cause the computer to:
execute one or more applications;
process one or more definitions received via a user input from an adapter user interface component, the one or more definitions including at least one dependency from a plurality of dependencies between one or more components;
generate one or more adapter configuration files associated with one or more adapters at an adapter configuration component, the one or more adapter configuration files including information associated with the plurality of dependencies;
based on the one or more definitions, resolve, at runtime of the one or more applications, the at least one dependency from the plurality of dependencies at a dependency analyzer component; and
in response to resolution of the at least one dependency, generate the one or more adapters at the framework, wherein the one or more adapters comprise an adapter application package interface (API), the adapter API comprising information relating to third-party dependencies capable of being resolved and compiled by the one or more adapters at runtime.

8. The non-transitory computer readable storage medium of claim 7, wherein the user interface component is to provide a user interface to receive, via a drag-and-drop operation, the user input comprising the one or more definitions including the one or more dependencies.

9. The non-transitory computer readable storage medium of claim 7, further comprising: a configuration to specific build tool component for parsing the one or more adapter configuration files and build one or more build specification files.

10. The non-transitory computer readable storage medium of claim 7, wherein the dependency analyzer component is to resolve the at least dependency by validating the one or more definitions associated with the plurality of dependencies.

11. The non-transitory computer readable storage medium of claim 7, wherein the instructions are further executable by the computer to: autocorrect the at least one dependency at least partially in response to a non-compliance of the plurality of dependencies being determined by the dependency analyzer component.

12. The non-transitory computer readable storage medium of claim 7, wherein the one or more adapter configuration flies include information related to the plurality of dependencies, the information comprising a version, one or more runtime components, and/or one or more dependent components.

13. A computer implemented method, comprising:
executing one or more applications;
processing one or more definitions received via a user input from an adapter user interface component, the one or more definitions including at least one dependency from a plurality of dependencies between one or more components;
generating one or more adapter configuration files associated with one or more adapters, the one or more adapter configuration files including information associated with the one or more dependencies;
based on the one or more definitions, resolving, at runtime of the one or more applications, the at least one dependency from the plurality of dependencies; and
in response to resolution of the at least one dependency, generating the one or more adapters at framework, wherein the one or more adapters comprise an adapter application package interface (API), the adapter API comprising information relating to third-party dependencies capable of being resolved and compiled by the one or more adapters at runtime.

14. The computer implemented method of cam 13, further comprising: providing a user interface to receive, via a drag-and-drop operation, the user input comprising the one or more definitions including the one or more dependencies via a drag-and-drop action.

15. The computer implemented method of claim 13, further comprising: parsing the one or more adapter configuration files and build one or more build specification files.

16. The computer implemented method of claim 13, wherein the at least one dependency is to be resolved by validating the one or more definitions associated with the at plurality of dependencies.

17. The computer implemented method of claim 13, further comprising: autocorrecting the at least one dependency at least partially in response to a non-compliance of the plurality of dependencies being determined.

18. The computer implemented method of claim 13, wherein the one or more adapter configuration files include information related to the plurality dependencies, the information comprising a version, one or more runtime components, and/or one or more dependent components.

* * * * *